US009104502B2

(12) United States Patent
Dunn et al.

(10) Patent No.: US 9,104,502 B2
(45) Date of Patent: Aug. 11, 2015

(54) MANAGING RESOURCE POOLS FOR DEADLOCK AVOIDANCE

(71) Applicant: International Business Machines Corporation, Armonk, NY (US)

(72) Inventors: Robert M. H. Dunn, Toronto (CA); Stacy R. Joines, Raleigh, NC (US); James M. Stephens, Palisades, MN (US); Brian W. Thomson, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 13/716,108

(22) Filed: Dec. 15, 2012

(65) Prior Publication Data

US 2014/0173613 A1 Jun. 19, 2014

(51) Int. Cl.
*G06F 9/46* (2006.01)
*G06F 9/52* (2006.01)
*G06F 9/50* (2006.01)

(52) U.S. Cl.
CPC ............ *G06F 9/524* (2013.01); *G06F 9/5016* (2013.01); *G06F 9/5061* (2013.01); *G06F 2209/5011* (2013.01)

(58) Field of Classification Search
None
See application file for complete search history.

(56) References Cited

U.S. PATENT DOCUMENTS

| 5,440,743 | A  | 8/1995  | Yokota et al.    |
|-----------|----|---------|------------------|
| 5,649,184 | A  | 7/1997  | Hayashi et al.   |
| 5,682,537 | A  | 10/1997 | Davies et al.    |
| 5,832,484 | A  | 11/1998 | Sankaran et al.  |
| 5,845,117 | A  | 12/1998 | Fujita           |
| 5,940,828 | A  | 8/1999  | Anaya et al.     |
| 6,292,488 | B1 | 9/2001  | Filgate          |
| 6,671,686 | B2 | 12/2003 | Pardon et al.    |
| 6,983,461 | B2 | 1/2006  | Hutchison et al. |
| 7,289,992 | B2 | 10/2007 | Walker           |
| 7,337,290 | B2 | 2/2008  | Rajamani et al.  |
| 7,657,892 | B2 | 2/2010  | Langen et al.    |
| 8,181,183 | B2 | 5/2012  | Doolittle et al. |
| 8,209,702 | B1 | 6/2012  | Roytman et al.   |
| 2004/0199734 | A1 | 10/2004 | Rajamani et al. |
| 2006/0206901 | A1 | 9/2006  | Chan             |
| 2007/0233924 | A1 | 10/2007 | Chauvet et al.   |
| 2010/0262972 | A1 | 10/2010 | Cocks et al.     |

OTHER PUBLICATIONS

Using JMS Connection Pooling with WebSphere Application Server and WebSphere MQ, Part 2 IBM publication, Sep. 26, 2007.*
United States Patent and Trademark Office, Office Action for U.S. Appl. No. 12/754,854, Feb. 28, 2014, pp. 1-21, Alexandria, VA, USA.

(Continued)

*Primary Examiner* — Mengyao Zhe
(74) *Attorney, Agent, or Firm* — Lee Law, PLLC; Christopher B. Lee

(57) ABSTRACT

In an illustrative embodiment of a method for managing a resource pool for deadlock avoidance, a computer receives a request from a thread for a connection from the resource pool, and determines whether the thread currently has at least one connection from the resource pool. Responsive to a determination that the thread currently has at least one connection from the resource pool, a new concurrent connection from one of a reserved partition of the resource pool is allocated and the connection is returned to the thread.

13 Claims, 7 Drawing Sheets

(56) References Cited

OTHER PUBLICATIONS

Christos D. Antonopoulos, et al., Informing Algorithms for Efficient Scheduling of Synchronizing Threads on Multiprogrammed SMPs, Proceedings of the 2001 International Conference on Parallel Processing (ICPP'01), Sep. 2001, pp. 123-130, IEEE, Valencia, Spain.
John M. Mellor-Crummey, et al., Scalable Reader-Writer Synchronization for Shared-Memory Multiprocessors, Proceedings of the Third ACM SIGPLAN Symposium on Principles and Practice of Parallel Programming, Jul. 1991, pp. 106-113, vol. 26, Issue 7, Association for Computing Machinery (ACM), New York, NY, USA.
Don P. Mitchell, et al., A Distributed Algorithm for Deadlock Detection and Resolution, Proceedings of the Third Annual ACM Symposium on Principles of Distributed Computing, 1984, pp. 282-284, Association for Computing Machinery (ACM), New York, NY, USA.
Shouhan Wang, et al., Towards Efficient Algorithms for Deadlock Detection and Resolution in Distributed Systems, Proceedings of the Fifth International Conference on Data Engineering, Feb. 1989, pp. 287-294, IEEE, Los Angeles, CA, USA.
Author Unknown, Express (Distributed operating systems), Version 7.0: Tuning connection pools, Webpage/site, Oct. 23, 2012, pp. 1-4, IBM Corporation, Published online at: http://pic.dhe.ibm.com/infocenter/wasinfo/v7r0/index.jsp?topic=%2Fcom.ibm.websphere.express.doc%2Finfo%2Fexp%2Fae%2Ftdat_conpoolman.html.
Steve Waldman, c3p0-JDBC3 Connection and Statement Pooling, Version 0.9.2-pre6, Webpage/site, Printed from website Nov. 23, 2012, pp. 1-23, Machinery for Change, Inc., Published online at: http://www.mchange.com/projects/c3p0/#contents.
Feiling Tang, et al., An efficient deadlock prevention approach for service oriented transaction processing, Journal Article: Computers and Mathematics with Applications, Jan. 2012, pp. 458-468, vol. 63, Elsevier, Ltd., Published online at: sciencedirect.com/science/article/pii/S0898122111006389.
Rakesh Agrawal, et al., The Performance of Alternative Strategies for Dealing with Deadlocks in Database Management Systems, IEEE Transactions on Software Engineering, Dec. 1987, pp. 1348-1363, vol. SE-13, No. 12, IEEE, Published online at: ieeexplore.ieee.org/xpl/login.jsp?tp=&arnumber=1702184&url=http%3A%2F%2Fieeexplore.ieee.org%2Fiel5%2F32%2F35883%2F01702184.pdf%3Farnumber%3D1702184.
Fragkiskos Pentaris, et al., Self-Deadlocks in Disparate Scientific Data Management Systems, 16th International Conference on Scientific and Statistical Database Management (SSDBM'04), Jun. 2004, pp. 1-11, IEEE, Published online at: computer.org/csdl/proceedings/ssdbm/2004/2146/00/21460445-abs.html.
United States Patent and Trademark Office, Office Action for U.S. Appl. No. 12/754,854, Aug. 16, 2012, pp. 1-10, Alexandria, VA, USA.
Philip P. Macri, Deadlock Detection and Resolution in a CODASYL Based Data Management System, Proceedings of hte 1976 ACM SIGMOD International Conference on Management of Data, 1976, pp. 45-49, ACM, New York, NY, USA.
Don P. Mitchell, et al., A Distributed Algorithm for Deadlock Detection and Resolution, PODC '84 Proceedings of the Third Annual ACM Symposium on Principles of Distributed Computing, 1984, pp. 282-284, ACM, New York, NY, USA.
Mukesh Singhal, Deadlock Detection in Distributed Systems, Journal: Computer, Nov. 1989, pp. 37-48, vol. 22, Issue 11, IEEE Computer Society Press, Los Alamitos, CA, USA.
United States Patent and Trademark Office, Office Action for U.S. Appl. No. 12/754,854, Dec. 6, 2012, pp. 1-15, Alexandria, VA, USA.
United States Patent and Trademark Office, Office Action for U.S. Appl. No. 12/754,854, Oct. 24, 2014, pp. 1-71, Alexandria, VA, USA.
Author Unknown, Oracle Berkeley DB Java Edition: Getting Started with Transaction Processing—Release 3.2, Dec. 5, 2006, pp. 17-23 (plus 2 title pages), Oracle, USA.
E. G. Coffman, Jr., et al., System Deadlocks, Computing Surveys, Jun. 1971, pp. 67-78, vol. 3, No. 2, Association for Computing Machinery, New York, NY.
Ugur Halici, EE442 Lecture Notes, Chapter 5: Deadlocks, Oct. 5, 2005, pp. 1-17, Middle East Technical University, Turkey.
Shibu K.V., Introduction to Embedded Systems, 2009, p. 446 (plus to title pages), Tata McGraw Hill Education Private Limited, New Delhi, India.
Author Unknown, Lock, Webpage: Whatis.com, Apr. 26, 2012, pp. 1-9, TechTarget, Retrieved from archived website at: http://web.archive.org/web/20120426170712/http://search400.techtarget.com/definition/lock.
Hector Garcia-Molina, et al., Section 10.3.2 The WaitsFor Graph, Database System Implementation, 1999, pp. 559-561 (plus to title pages), Prentice Hall, NJ.
Colin Stasiuk, Blocking vs Deadlocking . . . do you know the difference?, Blog/Webpage, Mar. 16, 2009, pp. 1-3, Benchmark IT Consulting , Retrieved from archived websites at: http://web.archive.org/web/20090704084040/ http://benchmarkitconsulting.com/colin-stasiuk/2009/03/16/blocking-vs-deadlocking-do-you-know-the-difference.
Dan Guzman, Blocking is not Deadlocking, Blog/Webpage, Sep. 27, 2012, pp. 1-4, Dan Guzman, USA.
Dr. Richard S. Hall, et al., Introduction to Operating Systems, Vorlesung 19525/SS 2001 (Lecture Notes), Apr. 17, 2001, pp. 1-14, University of Berlin, Germany.
Dahlia Malkhi, et al., 2006 Edsger W. Dijkstra Prize in Distributed Computing, PODC, Jul. 3, 2006, p. 1, ACM Symposium on Principles of Distributed Computing, USA.

* cited by examiner

Connection system
300

MANAGING RESOURCE POOLS FOR DEADLOCK AVOIDANCE

BACKGROUND

1. Technical Field

This disclosure relates generally to resource management in a data processing system and more specifically to managing resource pools for deadlock avoidance in the data processing system.

2. Description of the Related Art

Transaction processing applications, including Web applications, commonly connect to a database using a technique referred to as connection pooling, which caches and serially reuses physical connections implemented using Java Database Connectivity (JDBC) application programming interfaces. JDBC is a Java-based data access technology available from Oracle Corporation (Oracle® and Java® are registered trademarks of Oracle and/or its affiliates.) providing an application programming interface the Java programming language that defines how a client may access a database. JDBC is directed toward supporting various relational databases.

Connection pooling is a typically well-known technique for avoiding processing costs of establishing a network connection, authenticating an application with a target database, and allocating and freeing agent resources of the target database for each database session. Connection pooling is also used with resource managers other than databases, for similar reasons.

Application servers typically provide a managed database connection pooling facility that leverages a vendor provided database JDBC pooled connection factory. The connection pools have configuration parameters that typically include a maximum size pool parameter. The purpose of the maximum size pool parameter is to apply a limit to the connection resources that the application can consume. When an application thread requests a connection (and the request cannot be satisfied by creating a new handle to an active sharable connection with the correct context), a connection pool manager decides a course of action. The connection pool manager determines whether an idle connection is available in the pool, and responsive to a determination that an idle connection is available reuse the idle connection. Responsive to a determination an idle connection is not available and when the current pool size is less than the maximum size, allocate a new connection and return the new connection to the requester. However when an idle connection is not available and the current pool size is at the maximum size, wait for a busy connection to become idle and reuse the idle connection.

However, some applications concurrently request more than one connection from a pool to complete a transaction. Concurrent requests may occur due to a programming error, but also may be legitimate requests such as requests which occur when the application needs to perform synchronous tasks involving database writes that must commit independently of the unit of work whose execution triggered the task. For example, primary key generation and audit logging are two such tasks associated with transactions of a web based commerce application, because for correctness or performance reasons the tasks must not rollback when the original transaction fails. To accomplish the tasks, the commerce application suspends the global transaction and acquires a second connection with a distinct transactional context, performs the task, commits, releases the second connection and resumes the suspended global transaction.

Using the example, a request for a second legitimate connection from the connection pool increases the possibility of resource exhaustion deadlock. Deadlock can occur when the application requires more than one concurrent connection per thread, and the database connection pool is not large enough to serve the number of threads requesting connections. In an example scenario, each application thread requires two concurrent database connections and the number of threads is currently equal to the maximum connection pool size. Deadlock can occur when each thread has a first database connection, and all connections are in use and each thread is waiting for a second database connection, and no connections would become available because all threads are blocked.

A deadlock situation may be broken by a connection wait timeout. Application servers typically provide a configurable timeout, with a default number of minutes, but use of the timeout is not a practical solution in this scenario because a thread that eventually incurs that timeout typically also holds database locks and other resources allocated to the suspended global transactions associated with a first database connection. In a busy server, holding locks even for only a few extra seconds can severely impact the progress of other threads.

A conventional solution is to avoid deadlock by configuring the connection pool maximum size parameter to be greater than the total number of threads that can allocate connections. Using a maximum size parameter set sufficiently large, implies when every thread has acquired a first connection, connections will remain in the pool to satisfy second requests. Using this example solution is extremely pessimistic and typically leads to other problems, particularly with respect to resource usage.

A calculated maximum pool size may be more than 20 times a normal connection pool population when the application is running under design load. When an attempt to populate the pool to a maximum while maintaining connections alive although 80% or more of the connections are idle, a significant quantity of application server and database resources will be consumed. Additionally common firewall security policies in the datacenter that mandate killing idle connections will have to be circumvented.

Another conventional solution only populates the pool as needed. In this case a minor increase in load or degradation in throughput typically causes additional connections to be opened rapidly until the pool maximum is reached. However, in this case the pool is ineffective in achieving a main goal of avoiding a cost of opening connections, and extra load from creating new connections typically results in a connection storm where requests have to increasingly enter a queue which means new requests arriving at the application server activate more threads thereby requiring ever more new connections.

SUMMARY

According to one embodiment, in a method for managing a resource pool for deadlock avoidance, executing on a computer receives a request from a thread for a connection from the resource pool and determines whether the thread currently has at least one connection from the resource pool. Responsive to a determination that the thread currently has at least one connection from the resource pool, the computer allocates a new concurrent connection from one of a reserved partition. The computer returns the new concurrent connection from the one of the reserved partition to the requester.

According to another embodiment, a computer program product for managing a resource pool for deadlock avoidance comprises one or more computer recordable-type data storage devices containing computer executable program code stored thereon. The computer executable program code comprises computer executable program code for receiving a request from a thread for a connection from the resource pool; computer executable program code for determining whether the thread currently has at least one connection from the resource pool; computer executable program code responsive to a determination that the thread currently has at least one connection from the resource pool, for allocating a new concurrent connection from one of a reserved partition; computer executable program code for returning the new concurrent connection from the one of the reserved partition to the requester.

According to another embodiment, an apparatus for managing a resource pool for deadlock avoidance comprises a communications fabric, a memory connected to the communications fabric, wherein the memory contains computer executable program code, a communications unit connected to the communications fabric, an input/output unit connected to the communications fabric and one or more processors connected to the communications fabric. The one or more processors execute the computer executable program code to direct the apparatus to receive a request from a thread for a connection from the resource pool; determine whether the thread currently has at least one connection from the resource pool and responsive to a determination that the thread currently has at least one connection from the resource pool, allocate a new concurrent connection from one of a reserved partition. The one or more processors execute the computer executable program code to further direct the apparatus to return the new concurrent connection from the one of the reserved partition to the requester.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
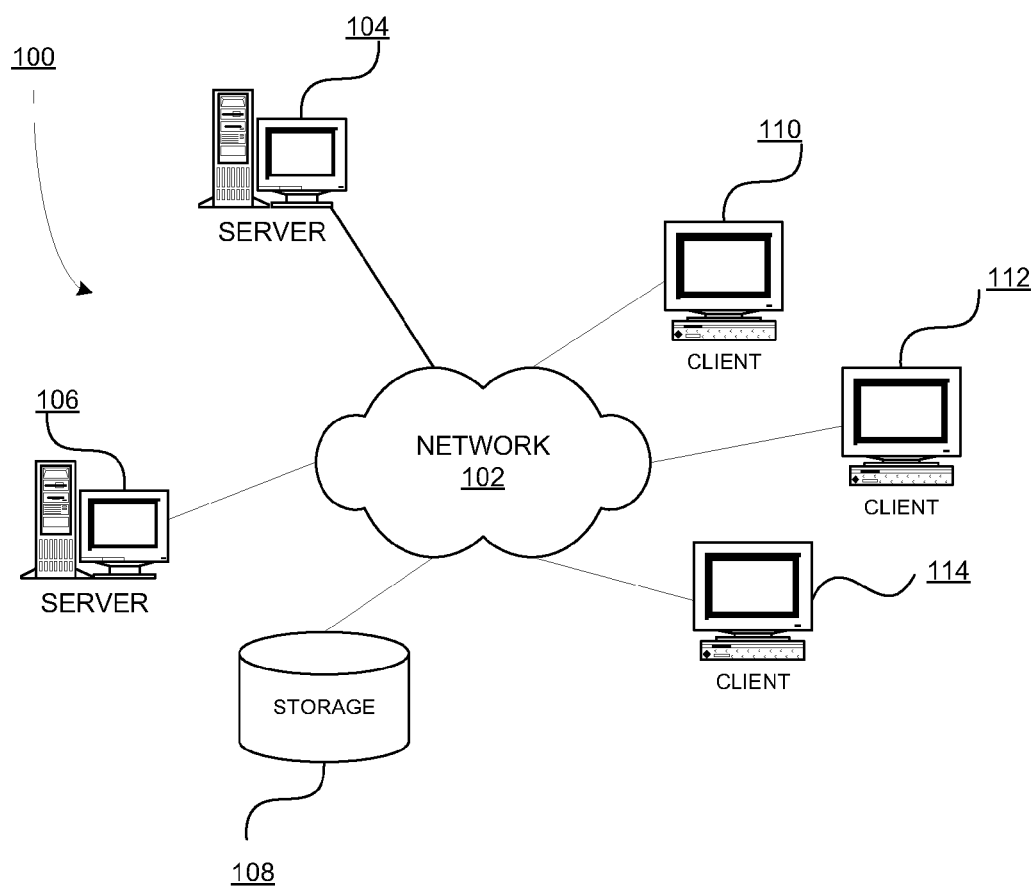
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable data storage devices having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing. More specific examples (a non-exhaustive list) of the computer-readable data storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
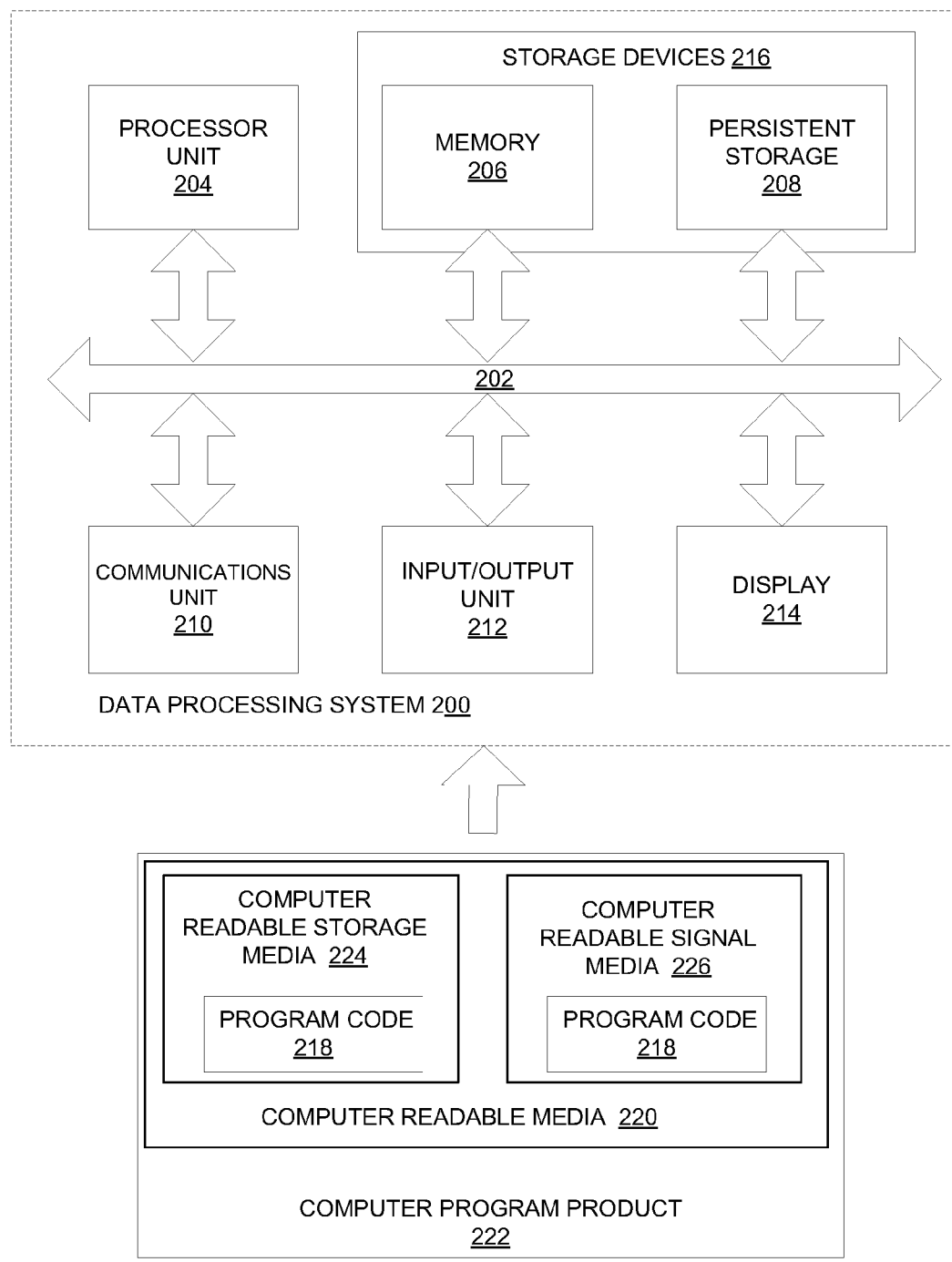
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of managing a resource pool for deadlock avoidance may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or more particularly a computer readable data storage device. In some instances, computer readable storage media 220 may not be removable. The computer readable data storage device does not encompass propagation media.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a method for managing a resource pool for deadlock avoidance is presented. Processor unit 204 executes computer program code to direct a connection manager to receive a request from a thread for a connection from the resource pool and determines whether the thread currently has at least one connection from the resource pool. Responsive to a determination that the thread currently has at least one connection from the resource pool, processor unit 204 further executes computer program code to direct the connection manager to allocate a new concurrent connection from one of a reserved partition. Processor unit 204 continues to execute computer program code to direct a connection manager to return the new concurrent connection from the one of the reserved partition to the requester.

In contrast with a conventional connection pool, an embodiment of the disclosure creates a connection pool having two or more partitions. An embodiment also provides a mechanism for tracking a number of connections from the pool on a per thread basis owned by each thread. In a connection manager is implemented a set of rules including a rule for performing an allocating from a partitioned pool. One rule states a condition in which a thread allocating a first connection may allocate only from the first partition of the two or more partitions. Another rule states a condition in which a thread allocating a second concurrent connection may allocate a second concurrent connection from either of the two or more partitions.

A total pool size, when using an embodiment of the disclosure, can typically be much smaller than one per thread, without risk of deadlock because a portion of the total connections are reserved for satisfying requests for a second concurrent connection from a requesting thread. Embodiments of the disclosure may be generalized to 3 or more partitions as necessary to support applications requiring 3 or more concurrent connections.

In an illustrative embodiment of the disclosure a partitioned connection pool having two partitions may be implemented using two connection pools of conventional design to implement the partitions. The configuration parameters of the partitioned pool are used to configure both underlying pools, except for the maximum size parameters. The partitioned pool maximum size is used to configure the maximum size of the first underlying partition pool or primary partition. A new partitioned pool parameter of reserved pool size is used to configure a maximum size of a second underlying partition pool, also referred to as a reserved partition. Additional allocation logic is provided within a connection manager to resolve connection requests, from threads that do not already possess a connection, from the first underlying partition pool (primary partition). The additional logic further enables requests from threads that already possess one connection are satisfied from a second underlying partition pool (reserve partition).

Figure 3:
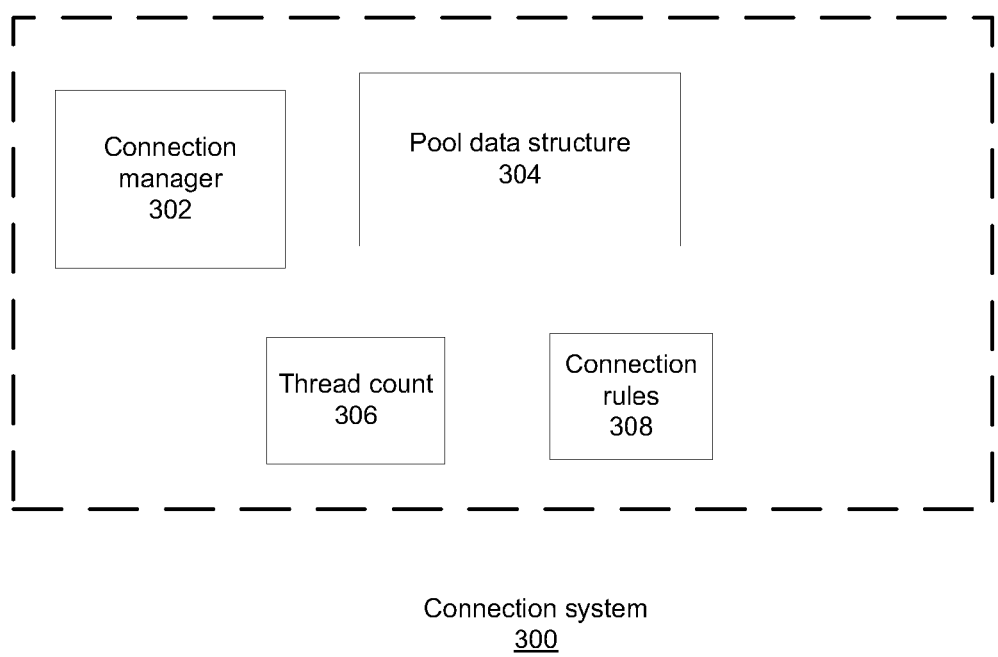
FIG. 3 is a block diagram of a connection system operable for various embodiments of the disclosure is presented.

With reference to FIG. 3 a block diagram of a connection system operable for various embodiments of the disclosure is presented. Connection system 300 is an example of a connection management system for partitioned pools of connections of the disclosure.

Connection system 300 comprises a number of components, leveraging an underlying data processing system such as network data processing 100 of FIG. 1 or data processing system 200 of FIG. 2, including connection manager 302, pool data structure 304, thread count 306 and connection rules 308. An embodiment of the disclosed components may be implemented as a set of discrete components and shown or other combinations of logical or physical components as described without limitation of the functions delivered.

Connection manager 302 provides a capability of managing the resource of connection system 300 and provides interfaces between resources of pool data structure 304 and requesters. Connection manager 302 uses thread count 306 to track a count of the number of connections a particular thread has currently open. For example, when a thread first acquires a connection, the respective thread count is 1, while a subsequent acquisition of a connection, which is concurrent, increments the thread count to a value of 2. Each subsequent connection acquired concurrently therefore increments the thread count. In a similar manner, each release of a concurrently held connection decrements the thread count.

In one embodiment thread count 306 is maintained on a per thread basis within connection manager 302. Connection count tracking may be implemented by maintaining, for each pool, a per-thread counter that is incremented when a connection is allocated and decremented when a connection is released. In another example embodiment thread count 306 is computed using typical thread maintenance information tracked by a program environment or system environment. For example, a virtual machine generates and maintains data on a per thread basis, from which is calculated the number of open connections associated with a particular thread. In this alternative, the counts may be determined on demand by traversing data structures maintained to track allocated connections and counting those related to the current thread and pool. The managed execution environment of the virtual machine typically maintains appropriate data structures to ensure connections can be properly released when the thread terminates abnormally.

Pool data structure 304 provides a capability to support conventional connection pool allocation and de-allocation of connections using a primary partition and one or more reserve partitions. Each partition is structured and operates much as a conventional connection pool having an initial allocation and a maximum size allocation as well. Connection manager 302 determines which partition to use when fulfilling a request for a connection for a thread using connection rules 308.

Connection rules 308 provides specifications enabling connection manager to address requests for connections while using only as much memory as needed to respond to initial requests and subsequent requests from a connection holding thread resulting in a concurrent connection for the thread. Rules 308 specify the logic to determine when to invoke reserve allocation as well as when a wait condition is the only solution. For example rules 308 can be used to specify an initial sizing of partitions comprising pool data structure 304 including a maximum size for a primary partition. Processing of the rules comprising rules 308 is further described using FIG. 5.

Figure 4:
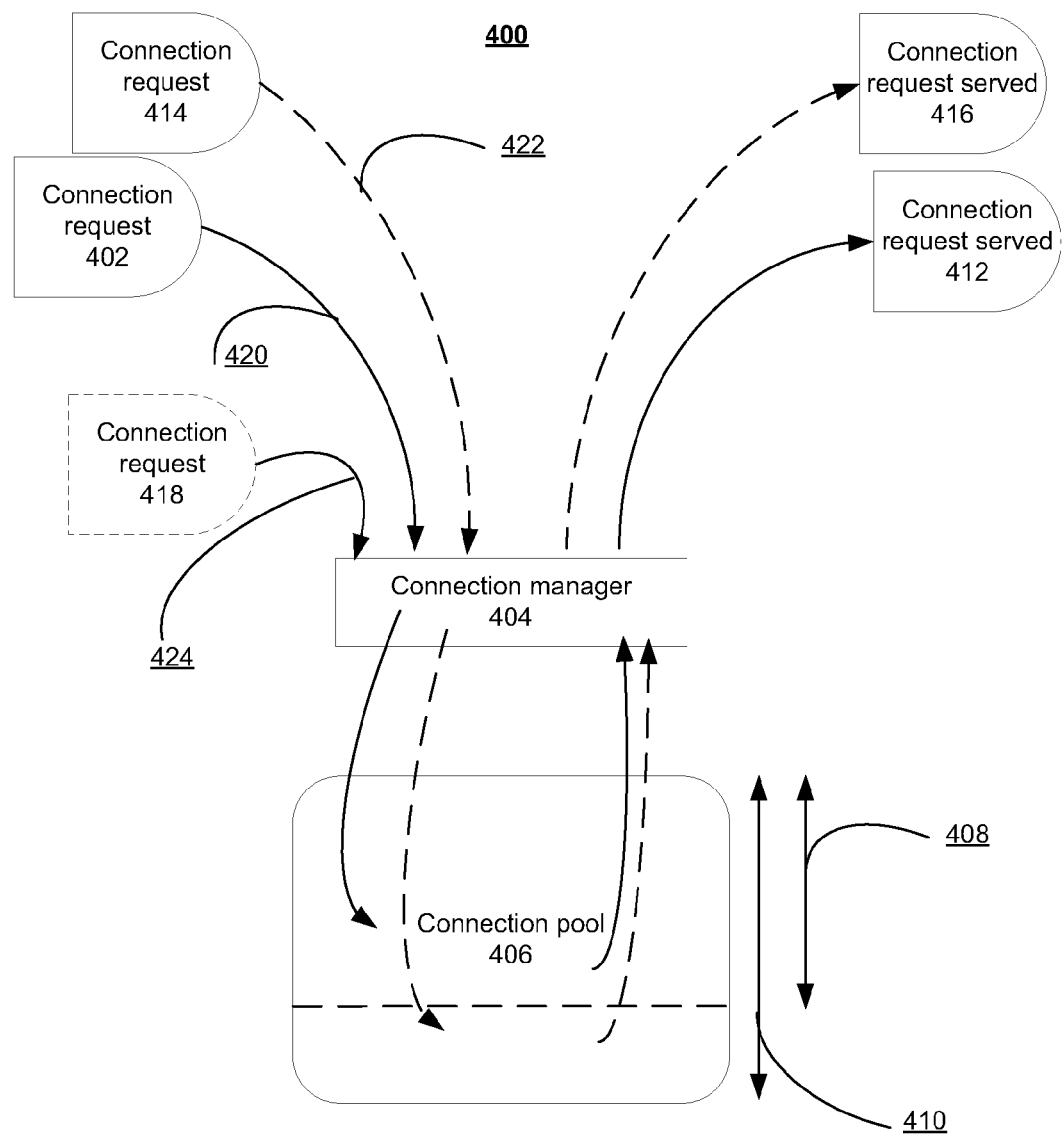
FIG. 4 is a block diagram of a conventional connection system is presented.

With reference to FIG. 4 a block diagram of a conventional connection system is presented. Connection system 400 is an example of a connection management system for a connection pool.

Connection request 402 is received at connection manager 404, through flow 420, which attempts to resolve the request using idle connections in connection pool 406. When idle connections are available in a portion designated as section 408 connection request served 412 is provided to a first requester.

Connection request 414 is received at connection manager 404, through flow 422, which attempts to resolve the request using idle connections in connection pool 406. When idle connections are not available in a portion designated as section 408 connection manager 404 determines whether a maximum size defined as max_size 410 is reached. In this scenario max_size 410 is not yet reached and a new connection is allocated. The newly allocated connection is returned as connection request served 416 is provided to the second requester.

Connection request 418 is received at connection manager 404, through flow 424, which attempts to resolve the request using idle connections in connection pool 406. When idle connections are not available in a portion designated as section 408 connection manager 404 determines whether a maximum size defined as max_size 410 is reached as before. However, in this case maximum size defined as max_size 410 is reached, therefore no further connections can be created. Connection request 418 from either the first or the second requester (or another requester) has to wait for connections in use to be released. The wait produces a potential deadlock situation when the first requester and the second requester are holding connections while waiting for a subsequent and concurrent connection to be allocated.

Figure 5:
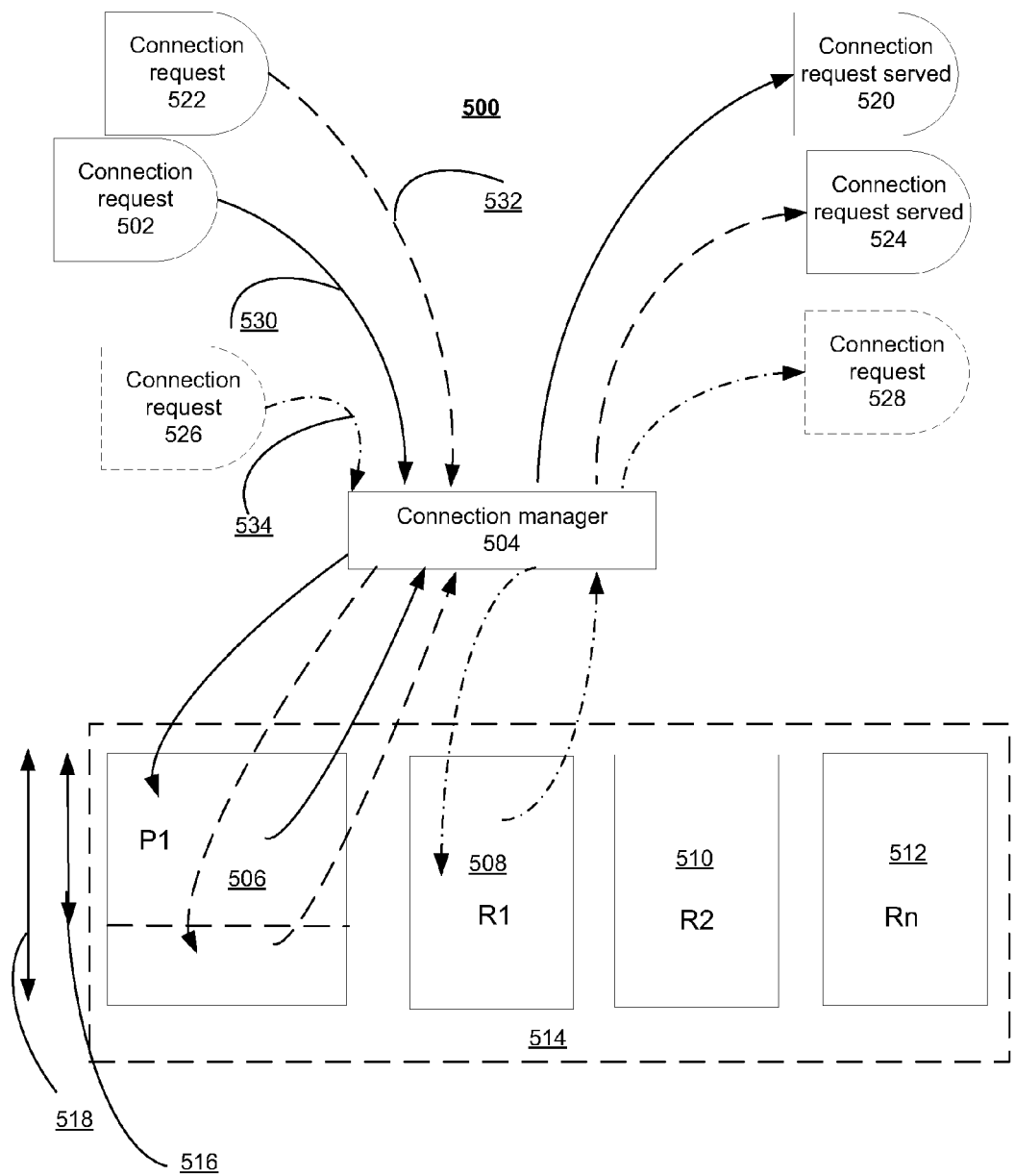
FIG. 5 is a block diagram of a connection system operable for various embodiments of the disclosure is presented.

With reference to FIG. 5 a block diagram of a connection system operable for various embodiments of the disclosure is presented. Connection system 500 is an example of connection system 300 of FIG. 3 using partitioned connection pools of the disclosure.

Connection request 502 from a first requester is received at connection manager 504, through flow 530, which attempts to resolve the request using idle connections in the connection pool using primary partition P1 506. When idle connections are available in a portion of primary partition P1 506 designated as size 516 a connection is obtained and provided as connection request served 520 to a first requester.

Connection request 522 from a second requester is received at connection manager 504, through flow 532, which attempts to resolve the request using idle connections in the connection pool using primary partition P1 506. When idle connections are not available in a portion designated as size 516 connection manager 504 determines whether a maximum size defined as max_size 518 is reached. In this scenario max_size 518 is not yet reached and a new connection is allocated. The newly allocated connection is returned from primary partition P1 506 as connection request served 524 and is provided to the second requester.

Connection request 526 from the first requester is received at connection manager 504, through flow 534, which attempts to resolve the request using idle connections in the connection pool using primary partition P1 506. Connection manager 404 however determines in this case the request is a second request from the first requester, while the first requester currently holds a connection. The request is therefore for a concurrent connection for the first requester. Connection manager 504 allocates a new connection from a reserved partition R1 508 rather than use a connection from primary partition P1 506. The newly allocated connection is returned as connection request served 528 and provided to the second requester.

When an application designer determines that a requester should not require more than two connections, and that an attempt by a thread to acquire more than two connections represents an error condition, then only two pool partitions 506 and 508 shall be configured and a subsequent connection request from the first requester while the first requester has two concurrent connections in use will fail with an error indication. Alternatively, when the application designer determines that a correctly functioning requester may require N number of concurrent connections greater than two, an embodiment of disclosure provides a third pool partition 510 and additional pool partitions 512 to a total of N partitions, and a subsequent connection request from the first requester while the first requester has two or more concurrent connections will cause connection manager 504 to allocate a connection from another reserve partition such as R2 510 or perhaps a reserve partition such as Rn 512 when more than a third concurrent connection is required.

When an initial request for a connection cannot be satisfied using primary partition P1 506 due to max_size 518 being reached, the requester will wait as before. When subsequent request for a connection from a requester currently holding a connection cannot be satisfied using an appropriate reserve partition the requester will have to wait. The wait produces a potential deadlock situation, as before, when the first requester and the second requester are holding connections while waiting for a subsequent and concurrent connection to be allocated.

An example of rule used to process the requests of the current example may be stated as a thread allocating a first connection may allocate only from the first or primary partition of a plurality of partitions of the resource pool providing connections. A thread allocating a second concurrent connection may allocate from either the first or a second partition of the plurality of partitions of the resource pool providing connections.

A total pool size can typically be much smaller when using an embodiment of the disclosure than one per thread of a prior solution, without risk of deadlock because some of the connections from the resource pool providing connections are now reserved for satisfying requests for a second concurrent connection.

Embodiments of the disclosed process are generalized to 3 or more partitions when necessary to deal with applications that require 3 or more concurrent connections. For example, an application requiring m concurrent connections is supported by m partitions in total of which m−1 partitions are reserved partitions in accordance with the disclosed process.

Figure 6:
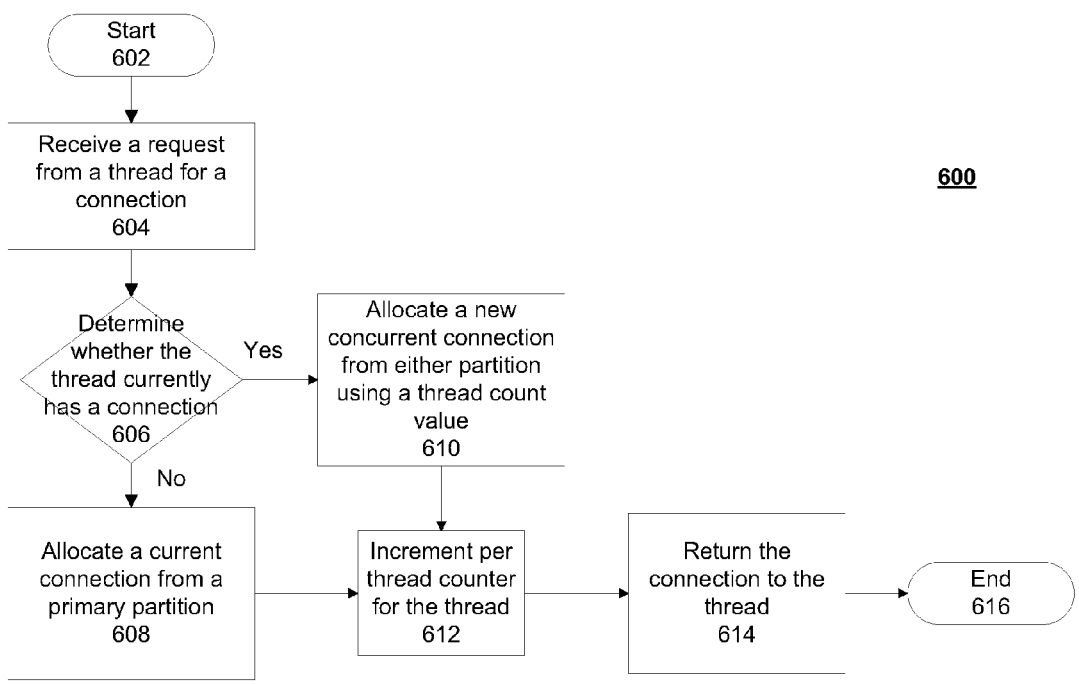
FIG. 6 is a flowchart of a concurrent connection portion of process of a connection system operable for various embodiments of the disclosure.

With reference to FIG. 6 a flowchart of a concurrent connection portion of process of a connection system operable for various embodiments of the disclosure is presented. Process 600 is an example of a process resolving a concurrent connection request using a resource pool comprising partitioned connection pools of connection management system 500 using FIG. 5.

Process 600 starts (step 602) and receives a request from a thread for a connection (step 604). The request is typically one of many requests from a transaction-oriented application. Process 600, executing in a connection manager, determines whether the thread requesting the connection from the resource pool currently has a connection by testing whether a thread count representative of a number of connections owned by the respective thread is zero (step 606).

Responsive to a determination that the thread currently has no connection (therefore a request for an initial connection), process 600 allocates a concurrent connection from a first or primary partition (step 608). The connection may be new connection or a re-use of an idle connection. Process 600 causes the thread count value associated with the respective thread to be incremented (step 612). Process 600 returns the new concurrent connection to the requester (step 612) and terminates thereafter (step 616).

However, responsive to a determination that the thread currently has a connection (therefore the subsequent request is for a concurrent connection), process 600 allocates a new concurrent connection from one of a reserved partition using a thread count value (step 610). A thread count value identifies the requester is currently holding a connection and indicates the number of connections held. The thread count value determines from which partition to obtain a requested connection. For example, when a requester holds one connection (thread count of one) while requesting a second (concurrent) connection either a first or primary partition or a reserve partition is used to resolve the request. When a requester holds two connections (thread count of two) and requests a third (concurrent) connection a second reserve partition is typically used to resolve the request.

Process 600 increments a per thread counter for the thread (step 612). Process 600 returns the new concurrent connection from a particular reserved partition to the requester (step 614) and terminates thereafter (step 616). As previously stated the per thread counter may be maintained within the connection manager or by another entity, such as in a managed environment of a virtual machine, but accessible to the connection manager. Each time a connection is released and accordingly returned to the resource pool, the thread count is decremented for the respective thread releasing the connection.

When a condition arises in which no reserve partition is available to resolve the request the requester waits for a connection to become available as in a conventional connection pool instance.

Figure 7:
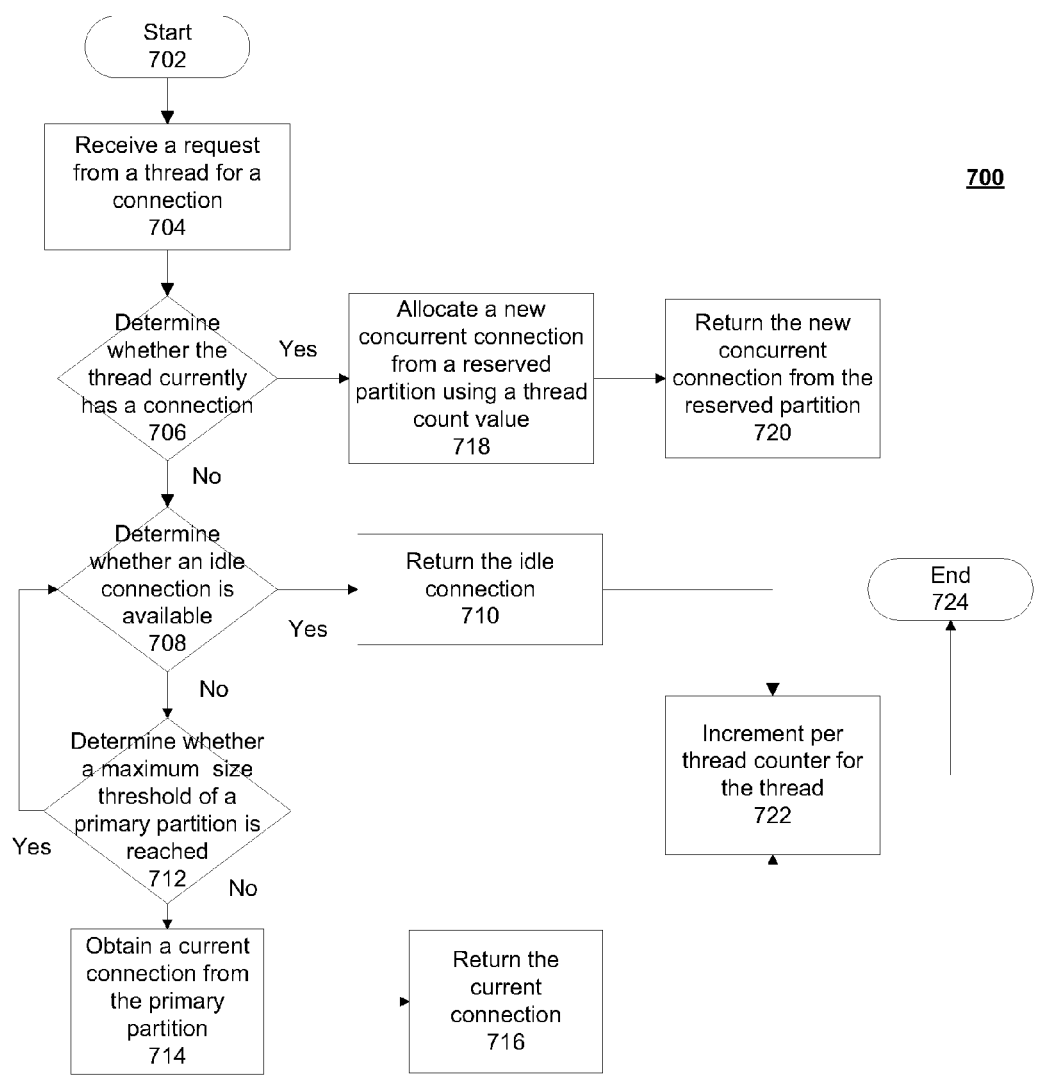
FIG. 7 is a flowchart of detailed process of a connection system operable for various embodiments of the disclosure.

With reference to FIG. 7 a flowchart of detailed process of a connection system operable for various embodiments of the disclosure is presented. Process 700 is an example of a process using partitioned connection pools of connection management system 500 using FIG. 5.

Process 700 starts (step 702) and receives a request from a thread for a connection (step 704). The request is typically one of many requests from a transaction-oriented application. Process 700, executing in a connection manager, determines whether the thread currently has a connection (step 706).

Responsive to a determination that the thread currently has no connection (therefore a request for an initial connection), process 700 determines whether an idle connection is available (step 708). A connection manager in response to a request typically provides an idle connection because that is the purpose of using a resource pool for connections. Responsive to a determination that an idle connection is available, process 700 obtains the idle connection and returns the idle connection to a requester (step 710). Process 700 causes a per thread counter for the thread to be incremented (step 722) and terminates thereafter (step 724). As previously stated the per thread counter may be maintained within the connection manager or by another entity, such as in a managed environment of a virtual machine, but accessible to the connection manager.

Responsive to a determination that an idle connection is not available, process 700 determines whether a maximum primary size threshold of a primary partition is reached (step 712). Responsive to a determination that the maximum primary size threshold of the primary partition is reached, process 700 returns to step 708 as before. The requesting thread in this situation has to wait for a connection to be released.

Responsive to a determination that the maximum primary size threshold of the primary partition is not reached, process 700 allocates and obtains a current connection from the primary partition (step 714). Process 700 returns the new connection from the primary partition to a requester (step 716). Process 700 causes the per thread counter for the thread to be incremented (step 722) and terminates thereafter (step 724). Each time a connection is released and accordingly returned to the resource pool, the thread count for a respective thread is decremented.

Returning to step 706, responsive to a determination that the thread currently has a connection (therefore a subsequent request for a concurrent connection), process 700 allocates a new concurrent connection from a reserved partition using a thread count value (step 718). The thread count value is used to determine whether the requester is currently holding a connection and if so the number of connections held. The thread count value determines which reserve partition to use to obtain a requested connection. For example, when a requester holds one connection while requesting a second (concurrent) connection the first reserve partition is used to resolve the request, while when a requester holds two connections while requesting a third (concurrent) connection a second reserve partition is used to resolve the request. Each time a request for a connection is fulfilled the thread count is incremented. Each time a connection is released and accordingly returned to the resource pool, the thread count for a respective thread is decremented to ensure an accurate count is maintained.

Process 700 returns the new concurrent connection from a reserved partition to the requester (step 720). Process 700 causes the per thread counter for the thread to be incremented (step 722) and terminates thereafter (step 724). Each time a connection is released and accordingly returned to the resource pool, the thread count for a respective thread is decremented.

Thus is presented in an illustrative embodiment a method for managing resource pools for deadlock avoidance. In one embodiment of the method a computer receives a request from a thread for a connection from a resource pool and determines, by a connection manager, whether the thread currently has at least one connection. Responsive to a determination that the thread currently has a connection from the resource pool, the method, using the connection manager, allocates a new concurrent connection from one of a reserved partition, causes a per thread counter for the thread to be incremented and returns the new concurrent connection to the requester. Each time a connection is released and accordingly returned to the resource pool, the thread count for the respective thread is decremented to ensure an accurate count is maintained.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product for managing a resource pool for deadlock avoidance, the computer program product comprising:

one or more computer recordable-type data storage devices containing computer executable program code stored thereon, the computer executable program code comprising:

computer executable program code for receiving a request from a thread for a connection from the resource pool;

computer executable program code for determining whether the thread currently has at least one connection from the resource pool; and computer executable program code responsive to a determination that the thread currently has at least one connection from the resource pool, for allocating a new concurrent connection to the thread from one of a reserved partition of the resource pool, where the reserved partition and the resource pool serve a same at least one resource.

2. The computer program product of claim 1, further comprising:

computer executable program code responsive to a determination that the thread currently has no connection from the resource pool, allocating a current connection from a primary partition of the resource pool; and computer executable program code responsive to a determination that allocating the new concurrent connection to the thread from the one of the reserved partition of the resource pool is unsuccessful, for waiting for a connection from the resource pool to be released.

3. The computer program product of claim 1, further comprising:

computer executable program code for defining a connection pool comprising more than one partition, where a partition maximum size parameter is used to configure a maximum size of a first partition, and a reserved size parameter is used to configure the maximum size of each additional partition.

4. The computer program product of claim 1, further comprising:

computer executable program code for tracking a number of connections from the resource pool owned by each thread, where a first thread allocating a first connection from the resource pool may allocate only from a first partition of the resource pool and the first thread allocating a concurrent connection may allocate from either the first partition or an additional partition of the resource pool.

5. The computer program product of claim 1, further comprising:

computer executable program code for maintaining, for each resource pool, a per-thread counter incremented when a connection is allocated and decremented when a connection is released; and computer executable program code for determining whether the thread currently has at least one connection from the resource pool comprises testing a current value of a counter corresponding to the thread and the resource pool.

6. The computer program product of claim 1, where the computer executable program code for determining whether the thread currently has at least one connection from the resource pool further comprises:
   computer executable program code for traversing data structures maintained by a managed execution environment to record connections allocated by the thread; and
   computer executable program code for counting a number of connections from the resource pool.

7. The computer program product of claim 1, further comprising:
   computer executable program code for calculating a number of partitions, managed by a connection manager, for an application requiring m concurrent connections to be m partitions in total including a first partition and m−1 partitions as reserved partitions.

8. An apparatus for managing a resource pool for deadlock avoidance, the apparatus comprising:
   a communications fabric;
   a memory connected to the communications fabric, where the memory contains computer executable program code;
   a communications unit connected to the communications fabric;
   an input/output unit connected to the communications fabric; and
   one or more processors connected to the communications fabric, where the one or more processors execute the computer executable program code to direct the apparatus to:
      receive a request from a thread for a connection from the resource pool;
      determine whether the thread currently has at least one connection from the resource pool; and
      responsive to a determination that the thread currently has at least one connection from the resource pool, allocate a new concurrent connection to the thread from one of a reserved partition of the resource pool, where the reserved partition and the resource pool serve a same at least one resource.

9. The apparatus of claim 8, where the one or more processors execute the computer executable program code to further direct the apparatus to:
   responsive to a determination that the thread currently has no connection from the resource pool, allocate a current connection from a primary partition of the resource pool; and
   responsive to a determination that allocating the new concurrent connection to the thread from the one of the reserved partition of the resource pool is unsuccessful, wait for a connection from the resource pool to be released.

10. The apparatus of claim 8, where the one or more processors execute the computer executable program code to further direct the apparatus to:
    define a connection pool comprising more than one partition, where a partition maximum size parameter is used to configure a maximum size of a first partition, and a reserved size parameter is used to configure the maximum size of each additional partition.

11. The apparatus of claim 8, where the one or more processors execute the computer executable program code to direct the apparatus to:
    track a number of connections from the resource pool owned by each thread, where a first thread allocating a first connection from the resource pool may allocate only from a first partition of the resource pool and the first thread allocating a concurrent connection may allocate from either the first partition or an additional partition of the resource pool.

12. The apparatus of claim 8, where the one or more processors execute the computer executable program code to further direct the apparatus to:
    maintain, for each resource pool, a per-thread counter incremented when a connection is allocated and decremented when a connection is released; and
    determine whether the thread currently has at least one connection from the resource pool by testing a current value of a counter corresponding to the thread and the resource pool.

13. The apparatus of claim 8, where the one or more processors execute the computer executable program code to determine whether the thread currently has at least one connection from the resource pool to further direct the apparatus to:
    traverse data structures maintained by a managed execution environment to record connections allocated by the thread; and
    count a number of connections from the resource pool.

* * * * *